US009868659B2

(12) United States Patent
Wang et al.

(10) Patent No.: US 9,868,659 B2
(45) Date of Patent: *Jan. 16, 2018

(54) SUBSURFACE WATER PURIFICATION METHOD

(71) Applicant: GENERAL ELECTRIC COMPANY, Schenectady, NY (US)

(72) Inventors: Hua Wang, Clifton Park, NY (US); Zamir Alam, Burlington (CA); Daniella B. Mosqueda-Jimenez, Burlington (CA); Jose Luis Plasencia Cabanillas, Blommenholm (NO); Nicholas William Harcsar Adams, Dundas (CA); Jason Daniel Cadera, Guelph (CA)

(73) Assignee: General Electric Company, Niskayuna, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/711,060

(22) Filed: May 13, 2015

(65) Prior Publication Data
US 2016/0304371 A1 Oct. 20, 2016

Related U.S. Application Data

(60) Provisional application No. 62/149,070, filed on Apr. 17, 2015.

(51) Int. Cl.
C02F 9/00 (2006.01)
B01D 61/02 (2006.01)
(Continued)

(52) U.S. Cl.
CPC ............ C02F 9/00 (2013.01); B01D 61/02 (2013.01); B01D 61/14 (2013.01); B01D 61/58 (2013.01);
(Continued)

(58) Field of Classification Search
None
See application file for complete search history.

(56) References Cited

U.S. PATENT DOCUMENTS 3,283,813 A * 11/1966 Kern ............... B01D 61/025
166/271
4,197,847 A 4/1980 Djerassi
(Continued)

FOREIGN PATENT DOCUMENTS

CN 101530681 A 9/2009
CN 201458864 U 5/2010
(Continued)

OTHER PUBLICATIONS

Ven et al.,"Hollow fiber ultrafiltration: The concept of partial backwashing", Journal of Membrane Science, ScienceDirect, vol. 320, Issues 1-2, pp. 319-324, Jul. 15, 2008.
(Continued)

Primary Examiner — Anuradha Ahuja
(74) Attorney, Agent, or Firm — Pabitra K. Chakrabarti

(57) ABSTRACT

A method of producing purified water in a subsurface environment is provided in which ambient subsurface source water is introduced into and through one or more ultrafiltration membrane units of a subsurface water treatment system and producing thereby an ultrafiltrate substantially free of solid particulates having a largest dimension greater than 0.1 microns. An electrochemical unit in fluid communication with at least one ultrafiltration membrane unit provides an antifoulant solution. An ultrafiltrate-rich backwash fluid and at least a portion of the antifoulant solution are delivered to at least one non-producing ultrafiltration membrane unit during a backwash cycle. A flux of source fluid through each of the ultrafiltration membrane units of less than thirty gallons per square foot per day limits the need for backwash cycles. A reduction in the number of
(Continued)

backwash cycles enhances system autonomy and useful life, and limits the need for intervention for maintenance and component replacement.

20 Claims, 9 Drawing Sheets

(51) Int. Cl.
| | |
|---|---|
| *B01D 61/14* | (2006.01) |
| *B01D 61/58* | (2006.01) |
| *B01D 63/02* | (2006.01) |
| *E21B 43/20* | (2006.01) |
| *C02F 1/44* | (2006.01) |
| *B01D 65/02* | (2006.01) |
| *C02F 103/08* | (2006.01) |
| *C02F 1/467* | (2006.01) |

(52) U.S. Cl.
CPC ............. *B01D 63/02* (2013.01); *B01D 65/02* (2013.01); *E21B 43/20* (2013.01); *B01D 2311/2603* (2013.01); *B01D 2311/2642* (2013.01); *B01D 2321/162* (2013.01); *C02F 1/441* (2013.01); *C02F 1/442* (2013.01); *C02F 1/444* (2013.01); *C02F 1/4674* (2013.01); *C02F 2103/08* (2013.01); *C02F 2303/16* (2013.01); *C02F 2303/20* (2013.01)

(56) References Cited

U.S. PATENT DOCUMENTS

| | | | |
|---|---|---|---|
| 4,346,011 A | 8/1982 | Brownstein | |
| 4,394,272 A | 7/1983 | Damerau | |
| 4,737,268 A | 4/1988 | Giddings | |
| 4,927,535 A | 5/1990 | Beck et al. | |
| 5,011,022 A | 4/1991 | Palepu et al. | |
| 5,277,774 A | 1/1994 | Shmidt et al. | |
| 5,282,982 A | 2/1994 | Wells | |
| 5,458,781 A * | 10/1995 | Lin ..................... | B01D 61/025 |
| | | | 210/641 |
| 5,578,213 A | 11/1996 | Miller et al. | |
| 5,789,148 A | 8/1998 | Van Vlasselaer et al. | |
| 5,932,100 A | 8/1999 | Yager et al. | |
| 5,944,999 A * | 8/1999 | Chancellor .......... | B01D 61/022 |
| | | | 210/170.07 |
| 5,958,243 A | 9/1999 | Lawrence et al. | |
| 5,961,832 A | 10/1999 | Shaw et al. | |
| 5,971,158 A | 10/1999 | Yager et al. | |
| 6,228,271 B1 | 5/2001 | Cote | |
| 6,325,928 B1 | 12/2001 | Pedersen et al. | |
| 6,454,945 B1 | 9/2002 | Weigl et al. | |
| 6,641,708 B1 | 11/2003 | Becker et al. | |
| 6,838,003 B1 | 1/2005 | Espenan et al. | |
| 7,070,695 B2 | 7/2006 | Husain et al. | |
| 7,264,608 B2 | 9/2007 | Bischof et al. | |
| 7,276,170 B2 | 10/2007 | Oakey et al. | |
| 7,674,382 B2 | 3/2010 | Musale | |
| 7,726,398 B2 * | 6/2010 | Collins .................. | E21B 43/20 |
| | | | 166/266 |
| 7,794,795 B2 | 9/2010 | Detty et al. | |
| 7,802,623 B2 | 9/2010 | Lunde et al. | |
| 7,977,088 B2 | 7/2011 | Smith | |
| 8,097,153 B2 | 1/2012 | Leonard et al. | |
| 8,097,155 B2 | 1/2012 | Ennis | |
| 8,157,774 B1 | 4/2012 | Altobelli | |
| 8,241,592 B2 | 8/2012 | Duffy, Jr. et al. | |
| 8,263,359 B2 | 9/2012 | Reschiglian et al. | |
| 8,361,321 B2 | 1/2013 | Stetson et al. | |
| 8,535,536 B1 | 9/2013 | Gale et al. | |
| 8,685,252 B2 | 4/2014 | Vuong et al. | |
| 8,789,594 B2 | 7/2014 | Curole et al. | |
| 8,794,320 B2 | 8/2014 | Ayirala et al. | |
| 2001/0052494 A1 | 12/2001 | Cote et al. | |
| 2002/0017483 A1 | 2/2002 | Chesner et al. | |
| 2002/0084221 A1 | 7/2002 | Verkaart et al. | |
| 2003/0230535 A1 * | 12/2003 | Affeld .................. | B01D 61/022 |
| | | | 210/652 |
| 2004/0019300 A1 | 1/2004 | Leonard | |
| 2004/0072278 A1 | 4/2004 | Chou et al. | |
| 2004/0229349 A1 | 11/2004 | Daridon | |
| 2004/0232076 A1 | 11/2004 | Zha et al. | |
| 2005/0077227 A1 | 4/2005 | Kirker et al. | |
| 2005/0148064 A1 | 7/2005 | Yamakawa et al. | |
| 2006/0108275 A1 | 5/2006 | Cote | |
| 2006/0198766 A1 | 9/2006 | Muller et al. | |
| 2007/0080113 A1 * | 4/2007 | Vuong .................. | B01D 61/022 |
| | | | 210/650 |
| 2007/0090039 A1 * | 4/2007 | Young .................... | B01D 61/04 |
| | | | 210/321.6 |
| 2007/0102359 A1 * | 5/2007 | Lombardi ............ | B01D 17/085 |
| | | | 210/639 |
| 2007/0246426 A1 * | 10/2007 | Collins .................. | C09K 8/528 |
| | | | 210/651 |
| 2008/0035541 A1 | 2/2008 | Franzreb et al. | |
| 2008/0169098 A1 * | 7/2008 | Christopher ......... | B01D 61/025 |
| | | | 166/275 |
| 2008/0257071 A1 | 10/2008 | Wimberger-Friedl et al. | |
| 2008/0264778 A1 * | 10/2008 | Joshi ...................... | A61L 2/035 |
| | | | 204/232 |
| 2008/0302732 A1 | 12/2008 | Soh et al. | |
| 2009/0220932 A1 | 9/2009 | Ingber et al. | |
| 2010/0018921 A1 * | 1/2010 | Ruehr .................. | B01D 61/025 |
| | | | 210/636 |
| 2010/0051463 A1 | 3/2010 | Kostrzewa | |
| 2010/0051546 A1 * | 3/2010 | Vuong .................. | B01D 61/027 |
| | | | 210/637 |
| 2010/0206744 A1 * | 8/2010 | Pereira ...................... | C01D 3/14 |
| | | | 205/687 |
| 2010/0237016 A1 | 9/2010 | Vuong | |
| 2011/0024361 A1 * | 2/2011 | Schwartzel | |
| 2011/0039303 A1 | 2/2011 | Jovanovich et al. | |
| 2011/0062079 A1 * | 3/2011 | Daines-Martinez . | B01D 61/022 |
| | | | 210/601 |
| 2011/0139729 A1 | 6/2011 | Nupnau et al. | |
| 2012/0067820 A1 | 3/2012 | Henthorne et al. | |
| 2012/0085649 A1 | 4/2012 | Sano et al. | |
| 2012/0149021 A1 | 6/2012 | Yung et al. | |
| 2012/0205307 A1 | 8/2012 | Boudinar | |
| 2012/0234731 A1 | 9/2012 | Senftleber | |
| 2012/0261340 A1 * | 10/2012 | Williams .............. | B01D 61/022 |
| | | | 210/641 |
| 2012/0292196 A1 * | 11/2012 | Albrecht .................... | C25B 1/00 |
| | | | 205/351 |
| 2012/0298579 A1 | 11/2012 | Jablonski et al. | |
| 2013/0032533 A1 | 2/2013 | Libman et al. | |
| 2013/0086980 A1 | 4/2013 | Gadini et al. | |
| 2013/0118978 A1 * | 5/2013 | Dufresne ................. | C02F 1/441 |
| | | | 210/641 |
| 2013/0146548 A1 | 6/2013 | Cote et al. | |
| 2013/0168250 A1 | 7/2013 | Fogleman et al. | |
| 2013/0192836 A1 * | 8/2013 | Heng ........................ | C02F 9/00 |
| | | | 166/305.1 |
| 2013/0263658 A1 | 10/2013 | Manalis et al. | |
| 2013/0306559 A1 | 11/2013 | Kantani et al. | |
| 2014/0131217 A1 * | 5/2014 | Buschmann ............ | C01B 7/01 |
| | | | 205/440 |
| 2014/0353252 A1 * | 12/2014 | Hester ...................... | E21B 43/26 |
| | | | 210/640 |
| 2015/0274553 A1 | 10/2015 | Pedenaud et al. | |
| 2015/0376033 A1 * | 12/2015 | Tao ............................ | C02F 1/44 |
| | | | 210/639 |

FOREIGN PATENT DOCUMENTS

| | | |
|---|---|---|
| CN | 102276075 B | 12/2012 |
| CN | 203108283 U | 8/2013 |
| CN | 102652902 B | 3/2014 |
| DE | 102007019347 B3 | 8/2008 |
| EP | 730639 B1 | 4/2003 |
| FR | 2995541 A1 | 3/2014 |

(56) References Cited

FOREIGN PATENT DOCUMENTS

| | | |
|---|---|---|
| GB | 2430196 A | 3/2007 |
| WO | 0006500 A1 | 2/2000 |
| WO | 0131053 A1 | 5/2001 |
| WO | 2011079217 A1 | 6/2011 |
| WO | 2012026827 A1 | 3/2012 |
| WO | 2013098193 A1 | 7/2013 |
| WO | 2014044978 A1 | 3/2014 |
| WO | 2014130041 A1 | 8/2014 |
| WO | 2014206919 A1 | 12/2014 |
| WO | 2016146520 A1 | 9/2016 |

OTHER PUBLICATIONS

Profio et al.,"Submerged hollow fiber ultrafiltration as seawater pretreatment in the logic of integrated membrane desalination systems", Desalination, ScienceDirect, vol. 269, Issues 1-3, pp. 128-135, Mar. 15, 2011.

Boczkowski et al.,"Water Injection and Sulfate Removal in the Offshore Oil & Gas Industry", GE power & water, Water & process technologies, Technical paper, 2015.

O'Donnell., "Membrane Technology Works on North Sea Platform", Oil & Gas, vol. No. 94, Issue No. 49, Dec. 2, 1996.

Tang et al., "Oil Recovery by Water flooding and Imbibition—Invading Brine Cation Valence and Salinity", SCA-9911, pp. 1-12, 1999.

Peter-Varbanets et al., "Stabilization of Flux During Dead-End Ultra-Low Pressure Filtration", Water Research, vol. No. 44, pp. 3607-3616, Apr. 16, 2010.

Derlon et al., "Activity of Metazoa Governs Biofilm Structure Formation and Enhances Permeate Flux During Gravity-Driven Membrane (GDM) Filtration", Water Research, vol. No. 47, pp. 2085-2095, Jan. 20, 2013.

Hegdal., "Subsea Water Intake & Treatment Subsea Water Injection for IOR Swit-Subsea Water Intake and Treatment", Seabox, Deep Water Conference, Perth, pp. 1-14, Nov. 14, 2013.

Akhondi et al., "Gravity-Driven Membrane Filtration as Pretreatment for Seawater Reverse Osmosis: Linking Biofouling Layer Morphology with Flux Stabilization", Water Research, vol. No. 70, pp. 158-173, Mar. 1, 2015.

A PCT Search Report and Written Opinion issued in connection with related PCT Application No. PCT/US2016/026373 dated Aug. 16, 2016.

A PCT Search Report and Written Opinion issued in connection with related PCT Application No. PCT/US2016/021030 dated Aug. 17, 2016.

Yue et al., "Miniature Field-Flow Fractionation System for Analysis of Blood Cells", Oak Ridge Conference, Clin. Chem., vol. No. 40, Issue No. 9, pp. 1810-1814, 1994.

Assidjo et al., "Osmolarity Effects on Red Blood Cell Elution in Sedimentation Field-Flow Fractionation", Journal of Chromatographic Science, vol. No. 37, Issue No. 7, pp. 229-236, Jul. 1999.

Brune et al., "Quality, Stability and Safety Data of Packed Red Cells and Plasma Processed by Gravity Separation Using a New Fully Integrated Hollow-Fibre Filter Device", Advances in Hematology, vol. No. 2010, pp. 1-6, 2009.

Dharmasiri, "Highly Efficient Selection, Enumeration, Enrichment, and Molecular Profiling of Low-Abundant Biological Cells", The Department of Chemistry, pp. 1-202, Dec. 2010.

Kersaudy-Kerhoas et al., "Validation of a Blood Plasma Separation System by Biomarker Detection", Lab on a , Chip, vol. No. 10, Issue No. 12, pp. 1587-1595, 2010.

Li et al., "An Integrated Microfluidic Device for Quantitative Measurement of Hepatocellular Carcinoma (HCC) Biomarkers in Whole Blood Samples", 15th International Conference on Miniaturized Systems for Chemistry and Life Sciences, Seattle, Washington, USA, pp. 1858-1860, Oct. 2-6, 2011.

Dimov et al., "Stand-Alone Self-Powered Integrated Microfluidic Blood Analysis System (SIMBAS)", Lab on a Chip, vol. No. 11, Issue No. 5, pp. 845-850, 2011.

International Search Report and Written Opinion issued in connection with related PCT Application No. PCT/EP2014/075569 dated Feb. 24, 2015.

International Search Report and Written Opinion issued in connection with related PCT Application No. PCT/US2014/070571 dated Mar. 20, 2015.

Non-Final Rejection towards related U.S. Appl. No. 14/563,334 dated Nov. 27, 2015.

Galligan et al., "Mesoscale Blood Cell Sedimentation for Rapid Collection of Millilitre Samples", Electronic Supplementary Material (ESI) for Lab on a Chip, This journal is © The Royal Society of Chemistry, pp. 1-7, 2015.

Galligan et al., "Mesoscale blood cell sedimentation for processing millilitre sample volumes", This journal is © The Royal Society of Chemistry, Lab Chip, vol. No. 15, pp. 3274-3277, 2015.

Non-Final Rejection towards related U.S. Appl. No. 14/167,393 dated Feb. 17, 2016.

Non-Final Rejection towards related U.S. Appl. No. 14/167,393 dated Jul. 1, 2016.

Non-Final Rejection towards related U.S. Appl. No. 14/243,469 dated Aug. 22, 2016.

Non-Final Rejection towards related U.S. Appl. No. 14/721,549 dated Nov. 3, 2016.

Final Rejection towards related U.S. Appl. No. 14/167,393 dated Nov. 14, 2016.

Final Rejection towards related U.S. Appl. No. 14/243,469 dated Dec. 12, 2016.

Final Rejection towards related U.S. Appl. No. 14/563,334 dated Jan. 26, 2017.

Notice of Allowance issued in connection with related U.S. Appl. No. 14/243,469 dated Feb. 28, 2017.

Advisory Action towards related U.S. Appl. No. 14/563,334 dated Mar. 16, 2017.

Final Rejection towards related U.S. Appl. No. 14/721,549 dated Apr. 20, 2017.

* cited by examiner

SUBSURFACE WATER PURIFICATION METHOD

This application is related to and claims priority from U.S. provisional application No. 62/149,070 filed Apr. 17, 2015 and which is incorporated herein by reference in its entirety.

BACKGROUND

This invention relates to systems and methods for producing purified water from ambient water present in subsurface environments. In particular, the invention relates to systems for purifying ambient water in a subsurface environment, wherein the systems incorporate ultrafiltration devices.

Water flooding for enhanced oil recovery (EOR) has been used for more than 75 years and accounts for a substantial portion of current oil production in the United States. Water flooding is used to extract the immobile oil present in the reservoir that would not otherwise naturally flow out of the reservoir. Usually this is a secondary recovery technique, however, it is being considered as well in primary and tertiary production for increased ultimate recovery.

In conventional water flooding processes, injection water may be taken from nearest available sources with little consideration to its chemical make-up. Sources of injection water onshore include rivers and aquifers, while seawater is used offshore. Water is usually filtered to remove particles to avoid clogging of the formation. Certain reservoirs require sulfate removal from the water to be used in the flooding process in order to reduce the formation barium sulfate and strontium sulfate scale within the reservoir. In a typical water flooding EOR protocol water is injected at a pressure approximately 500 psi (35 bars) higher than reservoir pressure. Single phase water injection pumps are typically used in subsea applications.

Low salinity water flooding (LSF) is a process of flooding the oil reservoir with water of known and suitable salinity in order to economically extract additional oil from the sandstone and carbonate reservoirs. Since the pioneering work by Tang and Morrow (See for example Guoqing Tang and Norman R. Morrow, *Oil Recovery by Waterflooding and Imbibition—Invading Brine Cation Valence and Salinity*, SCA-9911, 1999) the benefits of low salinity flooding have been demonstrated in both laboratory and field studies. LSF has been shown to produce 2% to 12% of additional oil than might otherwise have been produced using conventional flooding techniques.

The use of LSF in an oil field can make other chemical and polymer EOR flooding techniques more efficient and can provide cost savings by reducing chemical consumption while increasing hydrocarbon yields. Interestingly, there appears to exist an optimal range of salinity for a specific oil reservoir. The optimal salinity is believed to depend on reservoir characteristics such as mineralogy, formation water chemistry, oil composition, surface chemistry, formation pressure and temperature. The optimal salinity level is typically in the range of 1,000 to 10,000 ppm total dissolved solids (TDS).

In subsea oil field operations, currently available options for producing low salinity water for use in EOR flooding protocols include (1) installing a water treatment system on a topside platform and piping the product low salinity water to an injection well head on the sea floor, and (2) installing a subsurface water treatment system adjacent to the injection well on the sea floor. The first option is made unattractive by the high cost of piping and the limited space available on topside platforms. The second option, though attractive in that it obviates the need for high cost piping and limited platform space, is made unattractive by the subsurface environment itself which frequently has a high concentration of particulate matter which can severely limit the time interval during which a subsurface water treatment system may be operated without maintenance.

Thus, there is a need for new and more robust systems and methods for producing purified water in subsurface environments.

BRIEF DESCRIPTION

In one embodiment, the present invention provides method of producing purified water in a subsurface environment, the method comprising: (a) introducing ambient subsurface source water into and through one or more ultrafiltration membrane units and producing thereby an ultrafiltrate substantially free of solid particulates having a largest dimension greater than 0.1 microns; (b) preparing in an electrochemical unit in fluid communication with at least one ultrafiltration membrane unit an aqueous solution comprising one or more hypohalous acid species; and (c) delivering an ultrafiltrate-rich backwash fluid and at least a portion of the aqueous solution comprising one or more hypohalous acid species to at least one non-producing ultrafiltration membrane unit during a backwash cycle; wherein a flux of source fluid through each of the ultrafiltration membrane units is less than thirty gallons per square foot per day.

In another embodiment, the present invention provides a method of producing purified water in a subsurface environment, the method comprising: (a) introducing ambient subsurface source water into and through one or more ultrafiltration membrane units and producing thereby an ultrafiltrate substantially free of solid particulates having a largest dimension greater than 0.1 microns; (b) preparing in an electrochemical unit in fluid communication with at least one ultrafiltration membrane unit an aqueous solution comprising one or more hypohalous acid species; (c) delivering an ultrafiltrate-rich backwash fluid and at least a portion of the aqueous solution comprising one or more hypohalous acid species to at least one non-producing ultrafiltration membrane unit during a backwash cycle; (d) subjecting a portion of the ultrafiltrate to a nanofiltration separation step in a nanofiltration unit and to produce thereby a nanofiltrate and a retentate rejected by the nanofiltration unit; and (e) subjecting a portion of the ultrafiltrate to a reverse osmosis separation step in a reverse osmosis membrane unit and to produce thereby a permeate and a retentate rejected by the reverse osmosis membrane unit; wherein a flux of source fluid through each of the ultrafiltration membrane units is less than thirty gallons per square foot per day.

In yet another embodiment, the present invention provides method of producing a hydrocarbon comprising: (a) injecting purified water derived from an ambient subsurface source fluid into a hydrocarbon reservoir to stimulate flow of a hydrocarbon fluid from the reservoir; (b) receiving the hydrocarbon fluid in a hydrocarbon production well; and (c) transporting the hydrocarbon fluid from the production well to a storage facility; wherein the purified water is produced in a subsurface water treatment system comprising; (i) one or more ultrafiltration membrane units configured to produce from the source fluid an ultrafiltrate substantially free of solid particulates having a largest dimension greater than 0.1 microns; (ii) an electrochemical unit in fluid communication with at least one ultrafiltration membrane unit and configured to provide an aqueous solution comprising one or more hypohalous acid species; (iii) a backwash unit configured to deliver an ultrafiltrate-rich backwash fluid and at least a portion of the aqueous solution comprising one or more hypohalous acid species to at least one non-producing ultrafiltration membrane unit during a backwash cycle; (iv) a nanofiltration membrane unit configured to receive the ultrafiltrate and produce therefrom a nanofiltrate containing less than 100 parts per million sulfate species; and (iv) a reverse osmosis membrane unit configured to receive the ultrafiltrate and produce therefrom a reverse osmosis membrane permeate and a reverse osmosis membrane retentate; wherein a flux of source fluid through an ultrafiltration membrane unit is less than 30 gallons per square foot per day, and wherein the reverse osmosis membrane retentate is used as a source fluid for the electrochemical unit.

BRIEF DESCRIPTION OF THE DRAWING FIGURES

Various features, aspects, and advantages of the present invention will become better understood when the following detailed description is read with reference to the accompanying drawings in which like characters may represent like parts throughout the drawings. Unless otherwise indicated, the drawings provided herein are meant to illustrate key inventive features of the invention. These key inventive features are believed to be applicable in a wide variety of systems which comprising one or more embodiments of the invention. As such, the drawings are not meant to include all conventional features known by those of ordinary skill in the art to be required for the practice of the invention.

DETAILED DESCRIPTION

Figure 1:
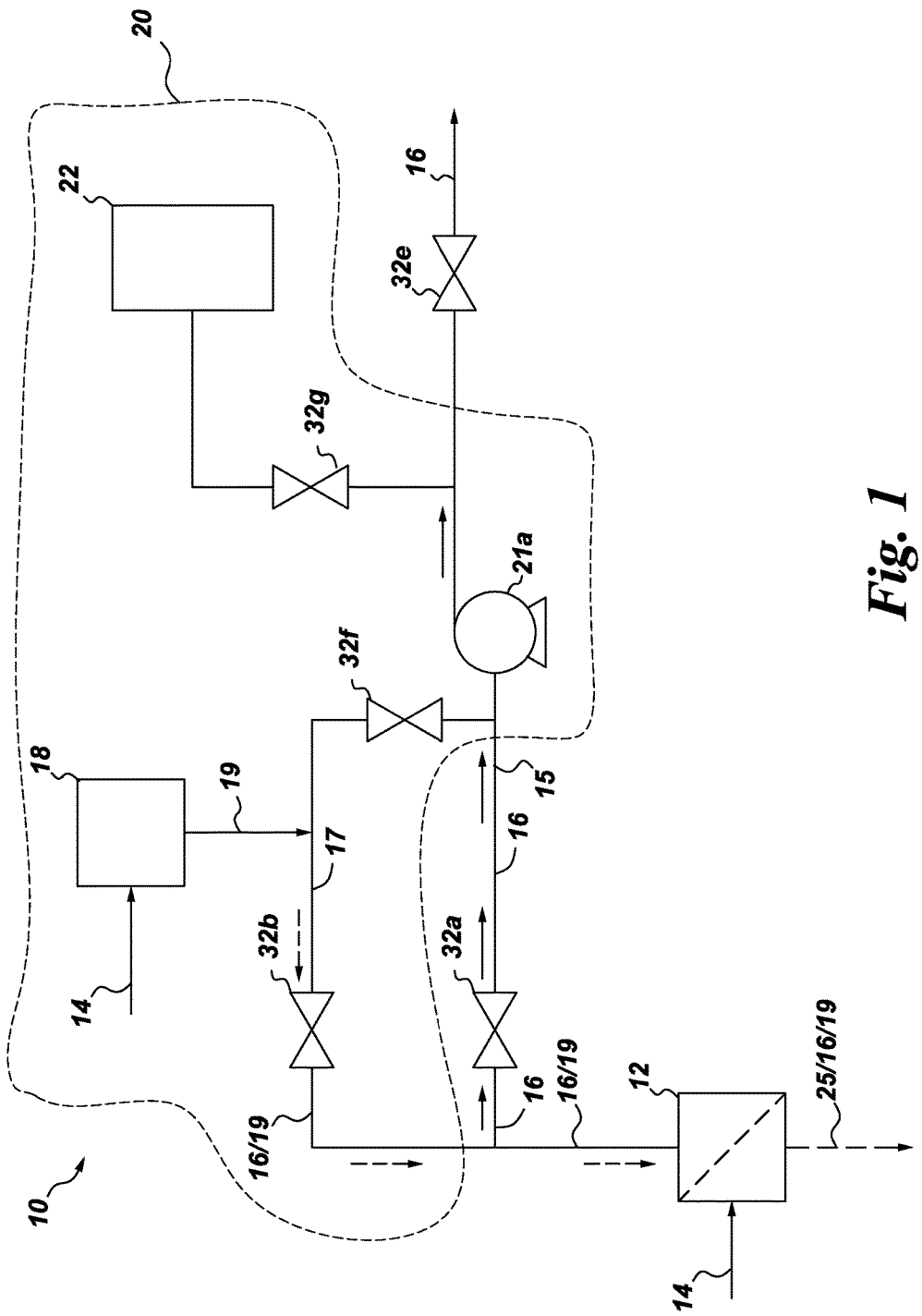
FIG. 1 illustrates a subsurface water treatment system provided by the present invention.

In the following specification and the claims, which follow, reference will be made to a number of terms, which shall be defined to have the following meanings.

The singular forms "a", "an", and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As noted, in one or more embodiments, the present invention provides a subsurface water treatment system comprising one or more ultrafiltration membrane units configured to produce an ultrafiltrate from ambient water present in a subsurface environment. This ambient water is at times herein referred to as "source fluid" and/or "source water". The subsurface environment is typically a zone within a water body such as a river, a lake or an ocean. In one or more embodiments, the source fluid may be fresh water, brackish water, or seawater. The present invention is anticipated to have a range of useful applications, for example the subsurface production of potable water in regions characterized by very cold winter temperatures. In addition, the present invention is anticipated to be especially useful in conjunction with enhanced oil recovery operations from subsea hydrocarbon deposits such as the deep water oil fields discovered beneath the Gulf of Mexico. In operation, the subsurface water treatment system may be supported by the floor of the water body; such as the sea bed; be suspended from surface ice, a support structure, such as a vessel or other offshore platform; or the subsurface water treatment system may be designed to float within the water column between the surface and the bottom.

Regardless of the source water used, the subsurface water treatment system provided by the present invention is configured to produce at least one product stream, an ultrafiltrate, which is substantially free of solid particulates falling within a certain size category.

As will be appreciated by those of ordinary skill in the art, the ultrafiltrate is produced by an ultrafiltration membrane unit component of the subsurface water treatment system. This ultrafiltration membrane unit serves to reduce the level of particulates in the source water being processed by the subsurface water treatment system and provides the ultrafiltrate substantially free of solid particulates having a largest dimension greater than 0.1 microns. For purposes of this disclosure the term substantially free of solid particulates means that solid particulates in the ultrafiltrate having a largest dimension greater than 0.1 microns are not present in an amount exceeding 100 parts per million. In one or more embodiments, the ultrafiltrate contains less than 50 parts per million of solid particulates having a largest dimension greater than 0.1 microns. In an alternate set of embodiments, the ultrafiltrate contains less than 10 parts per million of solid particulates having a largest dimension greater than 0.1 microns.

Suitable ultrafiltration membrane units are available in commerce and include those provided by GE Power and Water (e.g. ZEE WEED hollow fiber- and G SERIES spiral wound ultrafiltration membrane units), atech innovations gmbh (e.g. ceramic hollow fiber ultrafiltration membrane units), Qua Group (e.g. Q-SEP hollow fiber ultrafiltration membrane units), Koch Membrane Systems (e.g. PURON hollow fiber ultrafiltration membrane units), DOW (e.g. PDVF hollow fiber ultrafiltration membrane units), and TRISEP (e.g. SPIRASEP spiral wound ultrafiltration membrane units). As will be appreciated by those of ordinary skill in the art hollow fiber membranes may be single bore or polybore, and may be operated in various modes such as inside-out and outside-in flow patterns, in dead-end and cross-flow filtration modes, and in submerged or otherwise pressurized system configurations.

In one or more embodiments, the present invention provides a subsurface water treatment system comprising a single ultrafiltration membrane unit. In an alternate set of embodiments, the present invention provides a subsurface water treatment system comprising a plurality of ultrafiltration membrane units. In one or more embodiments, the ultrafiltration membrane unit may comprise hollow fiber membranes. In an alternate set of embodiments, the ultrafiltration membrane unit may comprise one or more membrane sheets. In yet another set of embodiments, the ultrafiltration membrane unit may comprise one or more membrane sheets configured in a spiral wound membrane structure.

During operation, source fluid to be purified is introduced into an ultrafiltration membrane unit optionally disposed within a housing suitably constructed of metal or plastic or some combination thereof. In one or more embodiments, the housing is configured as a cylinder. The housing is typically equipped with one or more screen filters which prevent larger particulates present in the source fluid from encountering the membrane surfaces of the ultrafiltration membrane unit. Other types of filters which may be used to effect the removal of particulates from the raw source fluid include disk filters and media filters. In one or more embodiments, the ultrafiltration membrane unit is disposed within a housing defining at least one sedimentation chamber (See numbered elements 75a, 75b and 75b of FIGS. 7 and 8, for example). Such features, filters and sedimentation chambers, are believed to be particularly advantageous in subsea environments in which substantial amounts of solid particulate matter may be present. Source fluid may be introduced into the ultrafiltration membrane unit by the action of one or more downstream pumps which draw ambient water into and through the ultrafiltration membrane unit. Alternatively, one or more upstream pumps may be used to drive ambient water through the ultrafiltration membrane unit to produce the ultrafiltrate.

In various embodiments, the subsurface water treatment system provided by the present invention comprises an electrochemical unit configured to convert water comprising halide ions into an aqueous solution comprising one or more hypohalous acid species. This solution may used to treat the ultrafiltration membrane unit and prevent its fouling by living organisms and/or non-living foulants present in the subsurface environment. Typically, the hypohalous acid species are presented to the ultrafiltration membrane during a backwash cycle at a concentration in a range from about 3 to about 200 parts hypohalous acid species per million parts of the backwash fluid. In one or more embodiments, the concentration of hypohalous acid species present presented to the ultrafiltration membrane unit in a chemical backwash cycle is 200 ppm or less, alternately 100 ppm or less, alternately 50 ppm or less, or alternately 30 ppm or less. Because hypohalous acid species may damage other system components such as nanofiltration membrane units and reverse osmosis membrane units, the subsurface water treatment system is appropriately valved or otherwise configured to prevent contact of sensitive components with hypohalous species. See, for example, FIG. 5 in which both valve 32 and the location of electrochemical unit 18 prevent hypohalous acid species from contacting nanofiltration membrane unit 50. In one or more embodiments, the system configured to prevent contact of sensitive components with residual hypohalous species by neutralization and/or reduction. Thus, in one or more embodiments, a reductant such as a sodium sulfite or cysteine solution may be metered into a stream of ultrafiltrate upstream of the sensitive system component, for example upstream of a system nanofiltration unit. In one or more embodiments, the system may be suitably equipped with a carbon filter configured to remove hypohalous acid species upstream of a downstream sensitive system component. In one or more embodiments, the system is configured both for the use of a chemical reductant stream and a carbon bed filter.

When the subsurface water treatment system is configured for operation in a saltwater environment, the ambient water will contain ample amounts of halide ions from which to generate neutral diatomic species such as chlorine ($Cl_2$), bromine ($Br_2$), and bromine monochloride (BrCl) which rapidly hydrolyze in water to hypohalous acid species such as hypochlorous acid (ClHO), hypobromous acid (BrOH) and the conjugate bases $ClO^-$ and $BrO^-$. The electrochemical unit may use raw seawater or one or more fluid streams produced by the subsurface water treatment system; filtered seawater, an ultrafiltrate, a nanofiltrate, a retentate stream rejected by a nanofiltration membrane unit, a retentate stream rejected by a reverse osmosis membrane unit, or a combination of two or more of the foregoing streams as a source of water comprising halide ions. Suitable electrochemical cells are known to those of ordinary skill in the art and may be advantageously incorporated into the electrochemical unit. The electrochemical unit, as with all system components, may be configured such that all components are constructively isobaric with the environment, meaning that any pressure differences between the component and the subsurface environment will not compromise the operability of the system.

The electrochemical unit typically comprises an electrochemical cell powered using the electrical power delivery and distribution network used to power other components of the subsurface water treatment system, for example system pumps. During operation power may be delivered to the subsurface water treatment system via an umbilical linking the system to a surface power source. In one or more embodiments, the electrochemical unit is configured to use ambient water as a source of water comprising halide ions. Under such circumstances, the electrochemical unit may comprise internal water purification components which allow the electrochemical unit to remove unwanted species capable of fouling the electrochemical cell or other electrochemical unit component. Thus, in one or more embodiments the electrochemical unit may comprise one or more filters, one or more ultrafiltration membranes, one or more nanofiltration membranes, one or more reverse osmosis membranes, one or more electrodialysis membranes, one or more electrodialysis membranes configured for electrodialysis reversal, or a combination of two or more of the foregoing filters and water purification membranes. The electrochemical unit may also comprise one or more fluid pumps configured to introduce water comprising halide ions where needed within the unit, for example into an electrochemical cell of the unit.

Where the subsurface water treatment system is configured for operation in a fresh water environment, the electrochemical unit may be equipped with a halide concentrating membrane such as are known to those of ordinary skill in the art, which may be used to supply halide ions extracted from the ambient water to an electrode component used to prepare aqueous solution comprising one or more hypohalous acid species.

In various embodiments, the subsurface water treatment system provided by the present invention comprises a backwash unit configured to deliver an ultrafiltrate-rich backwash fluid and at least a portion of the aqueous solution comprising one or more hypohalous acid species to at least one non-producing ultrafiltration membrane unit. An ultrafiltrate-rich backwash fluid is principally comprised of ultrafiltrate but may comprise other fluids and/or chemicals produced by or otherwise made available to the subsurface water treatment system. Thus, the ultrafiltrate-rich backwash fluid may comprise ambient water from the subsurface environment, or one or more fluid streams produced by the subsurface water treatment system; a stream of filtered ambient water, a nanofiltrate stream, a stream rejected by a nanofiltration membrane unit, a stream rejected by a reverse osmosis membrane unit, or a combination of two or more of the foregoing streams. In one or more embodiments, the backwash unit comprises at least one pump, at least one valve or system component such as a pump which may effectively function as a valve, and fluid lines providing for a reverse flow of backwash fluid through the ultrafiltration membrane unit. In a backwash cycle, at times herein referred to simply as a "backwash", forward flow through the ultrafiltration membrane unit undergoing backwash treatment is halted and a reverse flow of backwash fluid is made to flow through the ultrafiltration membrane unit. Backwash cycles serve to dislodge accumulated particulates on membrane surfaces of the ultrafiltration membrane unit. A backwash cycle, may include continuously exposing the ultrafiltration membrane unit to hypohalous acid species produced in the electrochemical unit together with a reverse flow of ultrafiltrate-rich backwash fluid. Alternatively, the backwash unit may force at least a portion of the aqueous solution comprising one or more hypohalous acid species and thereafter allow exposure of membrane surfaces to the hypohalous acid species under static conditions under which there is effectively no flow in either direction through the ultrafiltration membrane unit. Under certain backwash protocols, the backwash fluid may contain only ultrafiltrate.

In one or more embodiments, the subsurface water treatment system is equipped with turbulence generating components which may be used to scour one or more system surfaces. Suitable turbulence generating components include cavitation devices, sonication probes, and fluid jets (at times herein referred to as spray jets). In one such embodiment, the system is equipped with spray jets which may be directed at system surfaces upon which particulates may accumulate. The jets may be powered by system pumps and may use any available fluid as a scouring fluid. For example, the scouring fluid may comprise a stream of ambient water from the subsurface environment, or one or more fluid streams produced by the subsurface water treatment system.

During operation, the flux of fluid through the system should be appropriately limited in order to minimize the number backwash cycles necessary to maintain optimal performance. Thus, flux through individual ultrafiltration membrane units may be advantageously limited to less than 60 gfd (gallons per square foot of membrane surface per day), preferably less than 30 gfd, more preferably less than 15 gfd, and even more preferably less than 12 gfd. For comparable volumes of source fluid treated, lower rates of flow tend to reduce the accumulation of particulates on membrane surfaces of the ultrafiltration membrane unit relative to higher rates of flow.

A reduction in the number of backwash cycles enhances system autonomy and useful life, and limits the need for intervention for maintenance and component replacement. Depending on the application and the remoteness of the environment in which the system is deployed (e.g. a deep water environment versus a shallow water environment) the frequency of ultrafiltration membrane unit backwash cycles may be advantageously limited to less than 70 times per day, preferably less than 30 times per day, more preferably less than 10 times per day, and even more preferably less than 5 times per day. Typically, the duration of a backwash cycle is on the order of a few minutes. In one or more embodiments, the duration of a backwash cycle is preferably less than 20 minutes. In an alternate set of embodiments, the duration of a backwash cycle is preferably less than 10 minutes. In yet another alternate set of embodiments, the duration of a backwash cycle is preferably less than 5 minutes.

Similarly, the number of chemical backwash cycles, backwash cycles in which the backwash fluid contains an effective concentration of hypohalous acid species, may be appropriately limited due to the relatively low fluid flux through the ultrafiltration membrane unit employed in subsurface environments. Again, depending on the application and the remoteness of the environment in which the system is deployed (e.g. a deep water environment versus a shallow water environment) the frequency of chemical backwash cycles may be advantageously limited. In one or more embodiments, the duration of a chemical backwash cycle is preferably less than 20 minutes. In an alternate set of embodiments, the duration of a chemical backwash cycle is preferably less than 10 minutes. In yet another alternate set of embodiments, the duration of a chemical backwash cycle is preferably less than 5 minutes. The number of chemical backwash cycles may be equal to the total number of backwash cycles, or may be a significant fraction of the total number of backwash cycles, or may be only a small fraction of total number of backwash cycles, depending on the need for chemical treatment of the ultrafiltration membrane unit.

In one or more embodiments, the subsurface water treatment system provided by the present invention comprises at least one nanofiltration membrane unit, at times herein referred to as a nanofiltration unit. As will be appreciated by those of ordinary skill in the art, nanofiltration units may be employed to remove sulfate ions and other divalent ions such as calcium and magnesium from the fluid being processed. Suitable nanofiltration units include those provided by GE Power and Water (e.g. SWSR and the D-Series spiral wound nanofiltration membrane units), DOW (e.g. NF-Series spiral wound nanofiltration membrane units), Hydranautics-Nitto (e.g. ESNA-Series spiral wound nanofiltration membrane units), and Koch Membrane Systems (e.g. SPI-RAPRO-Series spiral wound nanofiltration membrane units).

In one or more embodiments, the nanofiltration unit is configured to receive the ultrafiltrate and produce therefrom a nanofiltrate containing less than 100 parts per million sulfate species (e.g. $CaSO_4$). In an alternate set of embodiments, the nanofiltration unit is configured to receive the ultrafiltrate and produce therefrom a nanofiltrate containing less than 50 parts per million sulfate ions ($SO_4^{-2}$). In one or more embodiments, the nanofiltrate is depleted in calcium and magnesium ions.

In one or more embodiments, the subsurface water treatment system provided by the present invention comprises at least one reverse osmosis membrane unit. As will be appreciated by those of ordinary skill in the art, reverse osmosis membrane units may be employed to substantially reduce the concentration of dissolved solids, such as salts, in the fluid being processed. Suitable reverse osmosis membrane units include those provided by GE Power and Water (e.g. A-Series spiral wound reverse osmosis membrane units), DOW (e.g. SW- and BW-Series spiral wound reverse osmosis membrane units), Hydranautics-Nitto (e.g. SWC-Series spiral wound reverse osmosis membrane units), and Koch Membrane Systems (e.g. Fluid System TFC-Series spiral wound reverse osmosis membrane units).

In one or more embodiments, the reverse osmosis membrane unit is configured to receive the nanofiltrate and produce therefrom a permeate substantially free of dissolved solids. In one or more alternate embodiments, the reverse osmosis membrane unit is configured to receive the at least a portion of the ultrafiltrate and to produce therefrom a permeate substantially free of dissolved solids. As used herein, the term substantially free of dissolved solids means that the permeate contains less than 2 percent by weight dissolved solids. In one or more embodiments, the permeate contains less than 1 percent by weight dissolved solids. In an alternate set of embodiments, the permeate contains less than 0.5 percent by weight dissolved solids. In yet another set of embodiments, the permeate contains less than 0.1 percent by weight dissolved solids.

Turning now to the figures, FIG. 1 illustrates a subsurface water treatment system 10 provided by the present invention and comprising a single ultrafiltration membrane unit 12. The system is shown as configured to use ambient seawater 14 as a source fluid. During forward operation, seawater enters and is processed by ultrafiltration membrane unit 12 to provide ultrafiltrate 16 which passes through valve 32a and along ultrafiltrate production line 15 motivated by fluid pump 21a. During forward operation valves 32e and 32g may be open in order to fill ultrafiltrate storage vessel 22 while simultaneously providing a stream of product ultrafiltrate 16 through valve 32e. Alternatively, one of valves 32e and 32g may be closed during forward operation, as when, for example, ultrafiltrate storage vessel 22 has been filled and the system may be operated in the forward mode with valve 32g closed and valve 32e open. As will be appreciated by those of ordinary skill in the art during forward operations valves 32b and 32f will typically be closed, but need not be in all situations.

Still referring to FIG. 1, the system comprises a backwash unit 20 configured to deliver at least a portion of the ultrafiltrate 16 and at least a portion of the aqueous solution 19 comprising one or more hypohalous acid species to at least one ultrafiltration membrane unit 12. The backwash unit comprises those components of the system needed to carry out backwash cycles and chemical backwash cycles. In the embodiment shown, backwash unit 20 includes pump 21a, ultrafiltrate storage vessel 22, valves 32g, 32f and 32b, backwash line 17 and electrochemical unit 18.

During a backwash cycle, valves 32a, 32e are typically closed and valves 32b, 32g and 32f are typically open. To initiate the backwash cycle, flow though pump 21a, which is a bidirectional pump capable of pumping a fluid in opposite directions, is changed from forward flow to reverse flow. In reverse flow mode, pump 21a draws ultrafiltrate 16 from ultrafiltrate storage vessel 22 through open valve 32g. The pump drives ultrafiltrate 16 through open valve 32f and into backwash line 17 and on to ultrafiltration membrane unit 12. The reverse flow of ultrafiltrate 16 through ultrafiltration membrane unit 12 dislodges particulates adhering to unit membrane surfaces and is discharged to the subsurface environment as discharge stream 25 which includes ultrafiltrate 16 enriched in particulates but otherwise having the same composition as sea water. Discharge stream may also include a portion of aqueous solution 19.

During a chemical backwash cycle electrochemical unit 18 delivers an aqueous solution 19 comprising one or more hypohalous acid species to backwash line 17 through which aqueous solution 19 passes and is delivered to ultrafiltration membrane unit 12. In one or more embodiments, aqueous solution 19 is delivered essentially as produced by the electrochemical unit to the ultrafiltration membrane unit. In an alternate set of embodiments, aqueous solution is delivered to ultrafiltration membrane unit after having been mixed with ultrafiltrate 16 from ultrafiltrate storage vessel 22. As will be appreciated by those of ordinary skill in the art, solution 19 may be delivered as produced (undiluted) to the ultrafiltration membrane unit by an electrochemical unit suitably equipped with a pump configured to drive aqueous solution 19 from the electrochemical unit to the ultrafiltration membrane unit with valves 32a and 32f in closed positions and pump 21a in a non-pumping mode. In the embodiment shown, ambient seawater provides the source of water comprising halide ions which is converted in electrochemical unit 18 into an aqueous solution 19 comprising one or more hypohalous acid species. As noted, electrochemical unit 18 may itself comprise one or more filters, one or more ultrafiltration membranes, one or more nanofiltration membranes, one or more reverse osmosis membranes, or a combination of two or more of the foregoing filters and water purification membranes to enable its efficient use of ambient subsurface water as a source fluid from which antifoulant solution 19 may be prepared.

Figure 2:
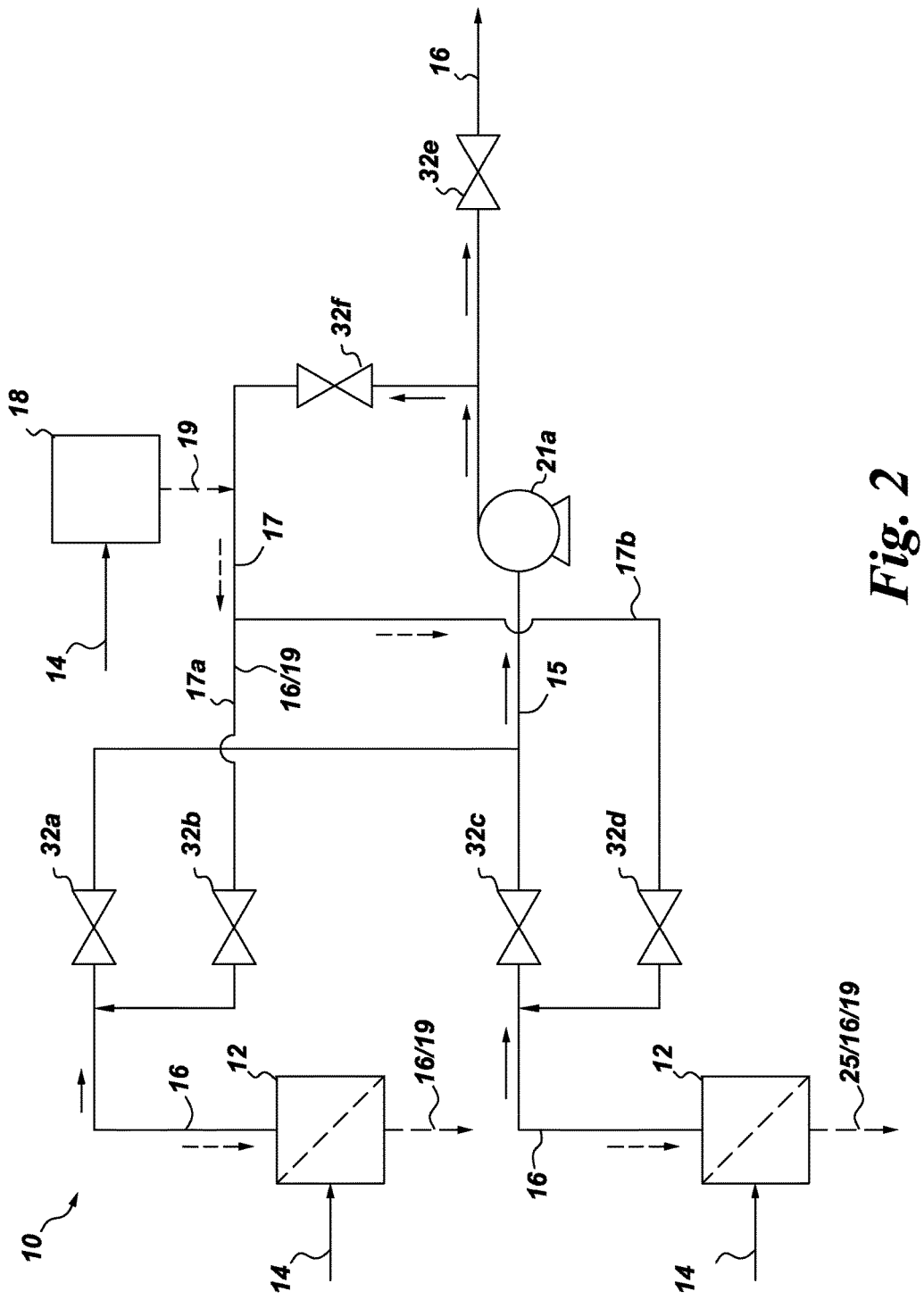
FIG. 2 illustrates a subsurface water treatment system provided by the present invention.

Referring to FIG. 2, the figure represents a subsurface water treatment system 10 provided by the present invention comprising a pair of ultrafiltration membrane units 12 which may simultaneously provide a single stream of ultrafiltrate 16. Alternatively, a first ultrafiltration membrane unit 12 may be used to provide a stream of ultrafiltrate 16 during a backwash cycle being applied to a second ultrafiltration membrane unit. This second ultrafiltration membrane unit is not operated in forward mode during the backwash cycle and is said to be non-producing.

During a forward operating cycle in which both the first and second ultrafiltration membrane units are producing ultrafiltrate 16, seawater 14 is drawn into and through each of the ultrafiltration membrane units by the action of system pump 21a. During such forward operation valves 32a, 32c and 32e are open and valves 32b, 32d and 32f are closed. As will be appreciated by those of ordinary skill in the art, when valves 32b and 32d are one-way valves (i.e. check valves) they will be effectively closed with respect to counter flow. In the embodiment shown, valves 32b and 32d may be check valves allowing flow toward their respective ultrafiltration membrane units 12 and preventing flow in the opposite direction.

Still referring to FIG. 2, the system may be operated during a backwash cycle as follows. For illustrative purposes we will consider a first backwash cycle in which the topmost ultrafiltration membrane unit 12 serves as the source of an ultrafiltrate stream being delivered to the non-producing bottommost ultrafiltration membrane unit 12. To effect such a backwash cycle valves 32b and 32c are closed while valves 32a, 32d and 32f are opened. Valve 32e may be open or closed. If open, valve 32e and/or one or more other system valves may be appropriately throttled to accommodate the simultaneous production of ultrafiltrate 16 at valve 32e while directing an effective amount of an ultrafiltrate-rich backwash fluid to a non-producing ultrafiltration membrane unit. Pump 21a draws ambient seawater 14 into and through the topmost ultrafiltration membrane unit. The ultrafiltrate produced passes through valve 32a and through ultrafiltrate production line 15. With valve 32e closed, or appropriately throttled, and valves 32f and 32d open, ultrafiltrate 16 is moved by the pump past electrochemical unit 18 and through backwash lines 17 and 17b to the bottommost ultrafiltration membrane unit 12. Those of ordinary skill in the art will understand that valves 32b and 32d may advantageously be check valves which may be additionally locked with respect to flow in either direction. For example, in the backwash cycle just described, flow of ultrafiltrate 16 through valve 32b must be prevented in order for pump 21a to efficiently propel ultrafiltrate 16 produced in the topmost ultrafiltration membrane unit 12 through the bottommost ultrafiltration membrane unit. During such a backwash cycle discharge stream 25 enriched in particulates exits the bottommost ultrafiltration membrane unit. In an alternate backwash cycle in which the bottommost ultrafiltration membrane unit 12 serves as the source of an ultrafiltrate stream being delivered to the non-producing topmost ultrafiltration membrane unit 12, ultrafiltrate 16 is moved by the pump past electrochemical unit 18 and through backwash lines 17 and 17a to the topmost ultrafiltration membrane unit 12.

Figure 3:
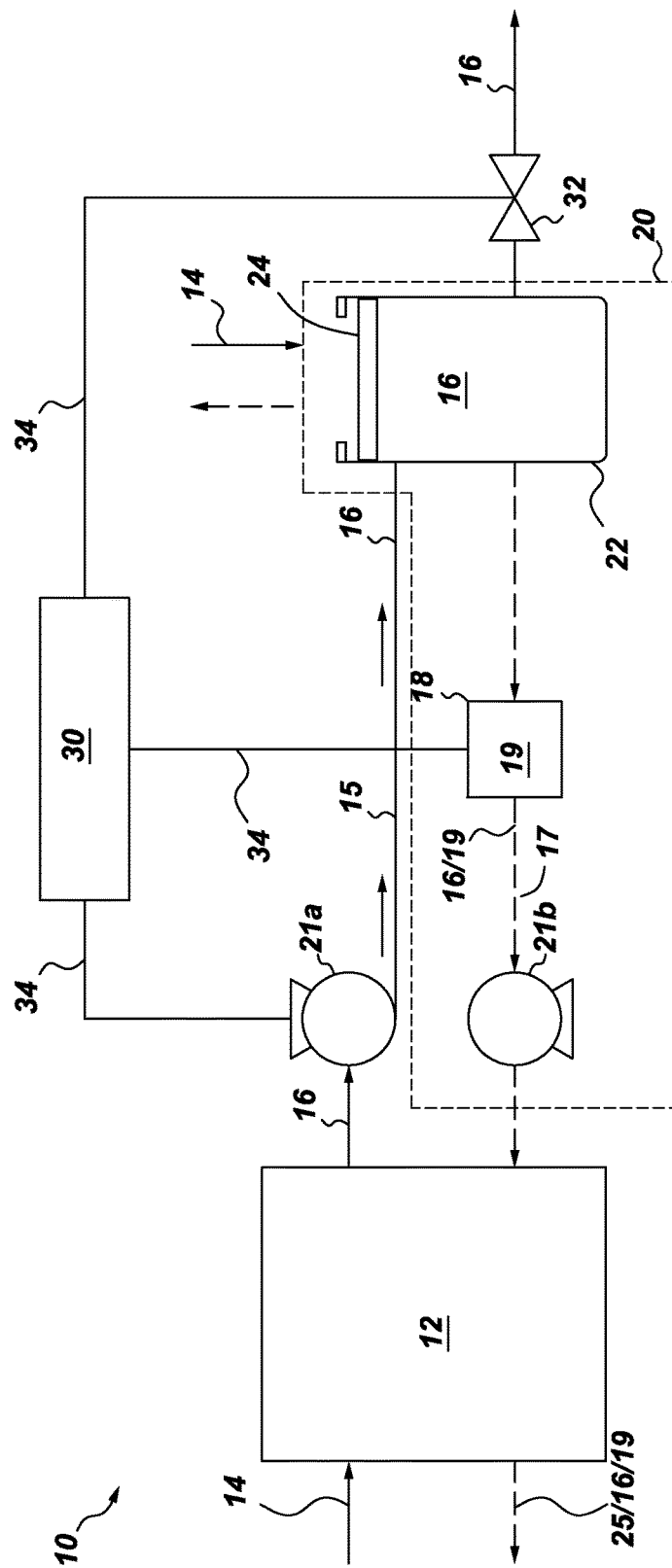
FIG. 3 illustrates a subsurface water treatment system provided by the present invention.

Referring to FIG. 3, the figure represents a subsurface water treatment system comprising a controller 30 configured to actuate various system components; pumps 21a and 21b, valve 32, and electrochemical unit 18. During forward operation, pump 21a draws ambient subsurface water 14 into and through ultrafiltration membrane unit 12 to produce ultrafiltrate 16 which is directed to ultrafiltrate storage vessel 22. As storage vessel 22 fills with ultrafiltrate 16 movable wall 24 is displaced in order to accommodate the ultrafiltrate. In one or more embodiments, ultrafiltrate storage vessel 22 is an expandable bladder-like vessel. Once storage vessel 22 has been filled, controller 30 opens valve 32 to provide a product stream of ultrafiltrate 16. Those of ordinary skill in the art will understand the steady state nature of the production of the ultrafiltrate stream exiting valve 32. Thus, once the storage vessel has been filled, the amount of ultrafiltrate present in the storage vessel need not change during a forward operating cycle.

In the embodiment shown, the system comprises a backwash unit 20 comprising pump 21b, backwash line 17, electrochemical unit 18 and storage vessel 22. To transition from a forward operating mode in which ultrafiltrate is being produced to a backwash cycle mode in which at least a portion of the produced ultrafiltrate is consumed as backwash fluid, controller 30 in response to an established backwash cycle schedule, or in response to a signal from a sensor within the ultrafiltration membrane unit, or elsewhere within the system, turns off pump 21a and closes valve 32. The controller may then direct that pump 21b be started in order to pump a mixture of antifoulant solution 19 and stored ultrafiltrate 16 through ultrafiltration membrane unit 12. In the embodiment shown, controller communication links, such as those illustrated by but not limited to numbered elements 34, allow the controller to sense system operating parameters and to control the operation of system components.

Figure 4:
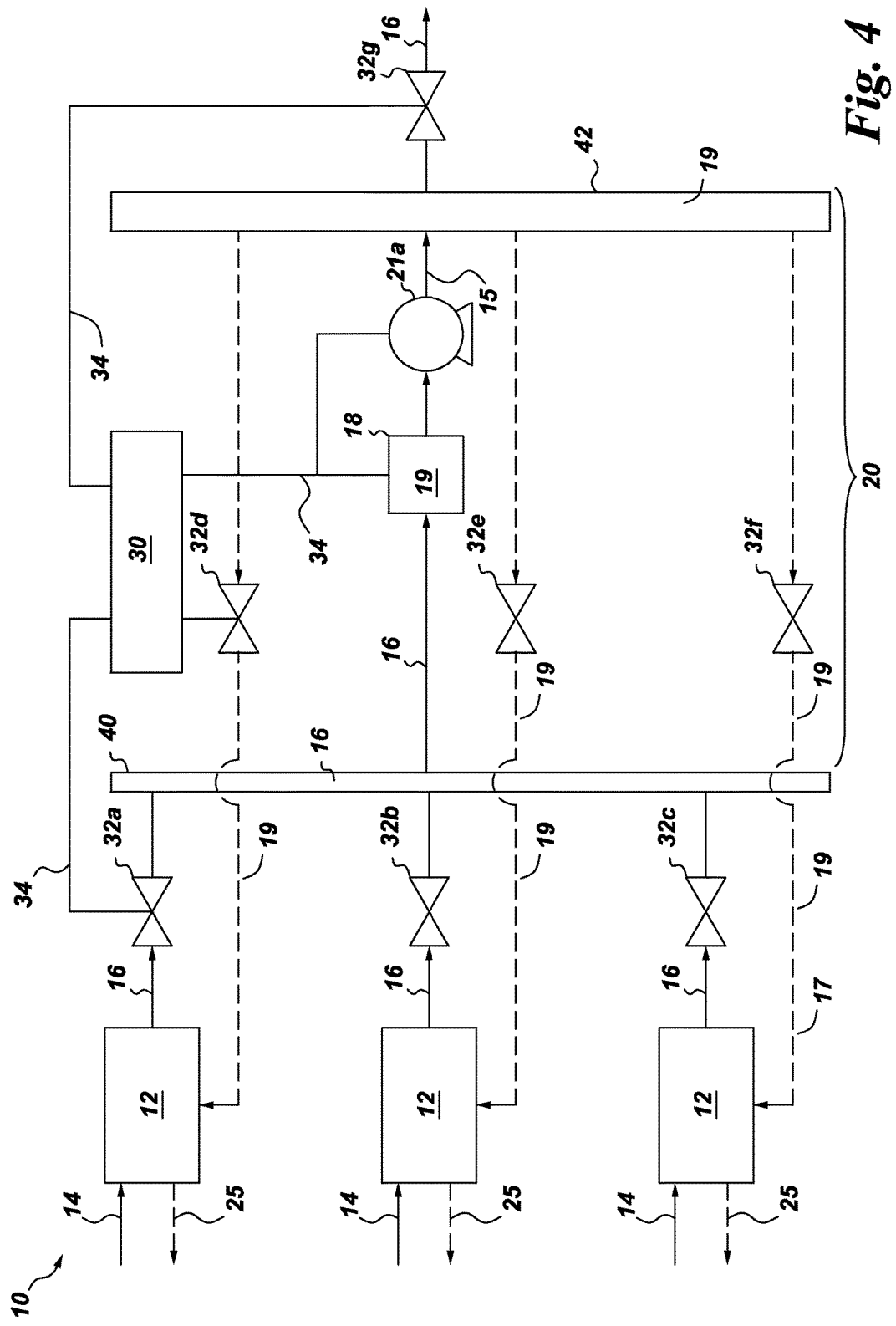
FIG. 4 illustrates a subsurface water treatment system provided by the present invention.

Referring to FIG. 4, the figure represents a subsurface water treatment system 10 provided by the present invention. In the embodiment shown, the system comprises a plurality of ultrafiltration membrane units 12. Controller 30 monitors system parameters and controls various system components. In one or more embodiments, controller 30 is configured to be located remote from system components deployed in a subsurface environment. In an alternate embodiment, controller 30 is configured to be located within the subsurface environment. In yet another embodiment, the controller 30 is configured to be deployed in a subsurface environment and to act as a relay for a master controller located outside of the subsurface environment.

During a first forward operational mode each of the ultrafiltration membrane units 12 produces ultrafiltrate 16 under the influence of a single pump 21a. The combined ultrafiltrate output of the ultrafiltration membrane units enters and is passed through ultrafiltrate manifold 40 and electrochemical unit 18. In practice, a slip stream of ultrafiltrate 16 only, passes through the electrochemical cell of the electrochemical unit 18. During a forward operational mode, electrochemical unit may advantageously be turned off such that antifoulant solution 19 is not being produced. The combined output 16 of the ultrafiltration membrane units 12 passes through manifold 42 and out through valve 32g. As will be appreciated by those of ordinary skill in the art, during the forward operational mode just described, each of valves 32a, 32b, 32c and 32g will be open, whereas each of valves 32d, 32e, and 32f will be closed.

During a backwash cycle, production from at least one of the ultrafiltration membrane units is used to generate a reverse flow of backwash fluid through at least one ultrafiltration membrane unit which is not producing ultrafiltrate. For illustrative purposes, we will consider a backwash cycle in which the two topmost ultrafiltration membrane units 12 continue to operate while the bottommost ultrafiltration membrane unit 12 is not producing ultrafiltrate. Under such circumstances, valves 32a and 32b remain open while valve 32c is closed. Valve 32g may be closed or remain open or partially open depending on the circumstances. For example, in an oil reservoir flooding operation it may be desirable not to interrupt the flow of water being produced by the system to the reservoir. Thus, under various conditions, valve 32g may remain open during a backwash cycle. Under the influence of pump 21a ultrafiltrate 16 is drawn from the two topmost ultrafiltration membrane units into ultrafiltrate manifold 40 and from there into electrochemical unit 18 which may be on or off depending on whether the backwash cycle includes feeding antifoulant solution 19 back to the ultrafiltration membrane unit being back flushed. For illustrative purposes we will assume a chemical backwash cycle in which electrochemical unit is directed by controller 30 to begin generating antifoulant solution 19. In the embodiment shown, ultrafiltrate 16 stream serves as the source fluid for the electrochemical unit where it is converted into antifoulant stream 19. Pump 21a drives antifoulant stream 19 through manifold 42 and through open backwash unit valve 32f to bottommost ultrafiltration membrane unit 12 from which it emerges as discharge stream 25. Valves 32d and 32e, although configured to be capable of serving as components of the backwash unit 20, remain closed in this illustrative example.

Figure 5:
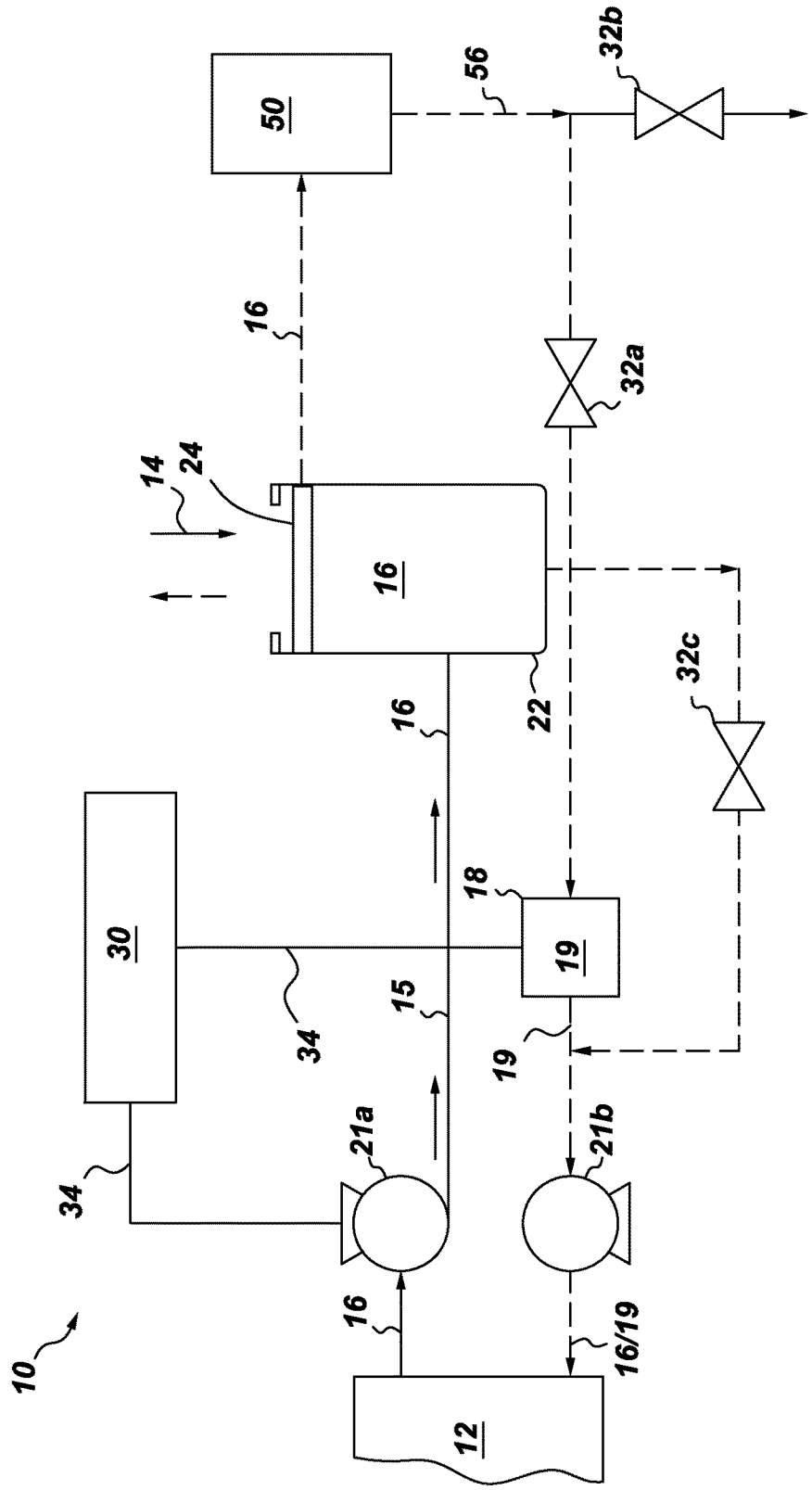
FIG. 5 illustrates a subsurface water treatment system provided by the present invention.

Referring to FIG. 5, the figure represents a subsurface water treatment system 10 provided by the present invention having a single ultrafiltration membrane unit 12 configured as in the embodiment shown in FIG. 3 with the a principal exception being that the system further comprises a nanofiltration unit 50 which provides a nanofiltrate 56 as source fluid to electrochemical unit 18. In the embodiment, the system is shown operating in a backwash cycle which may be either a chemical backwash cycle in which the backwash fluid comprises an effective amount of one or more hypohalous acid species, or alternatively ultrafiltrate 16 alone. At times herein an ultrafiltrate-rich backwash fluid containing hypohalous acid species will be designated by element number 19/16. During the backwash cycle illustrated in FIG.

5, pump 21*a* is in a non-pumping mode while backwash unit pump 21*b* draws a first stream of ultrafiltrate 16 from storage vessel 22 though nanofiltration unit 50. The resultant nanofiltrate 56 is then drawn through open valve 32*a* and into electrochemical unit 18 where it is converted into antifoulant solution 19. Simultaneously pump 21*b* draws a second stream of ultrafiltrate from storage vessel through valve 32*c*. Valves 32*a* and 32*c* are subject to controller 30 and act to limit the relative flow rates of the first and second streams of ultrafiltrate. In the backwash cycle example presented here, valve 32*b* remains closed. In the embodiment shown, a backwash fluid designated 19/16 is delivered to the non-producing ultrafiltration membrane unit 12 (FIG. 3).

Figure 6:
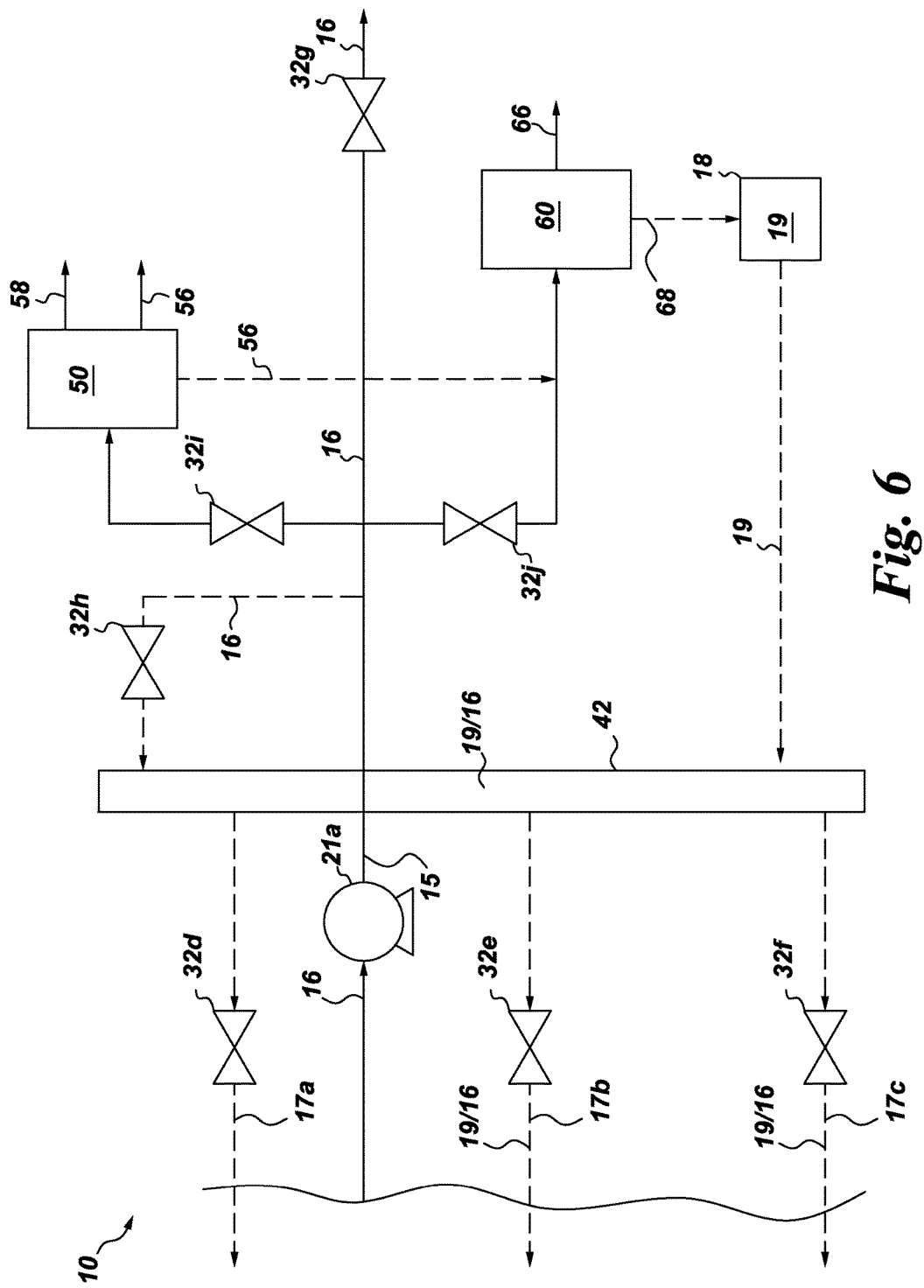
FIG. 6 illustrates a subsurface water treatment system provided by the present invention.

Referring to FIG. 6, the figure represents a subsurface water treatment system 10 provided by the present invention having a plurality of ultrafiltration membrane units 12 configured as in the embodiment shown in FIG. 4. In the embodiment shown, the system further comprises a nanofiltration unit 50 and a reverse osmosis membrane unit 60. During forward operation, the combined output of the ultrafiltration membrane units passes through ultrafiltrate manifold 40 (FIG. 4). Driven by pump 21*a* the combined stream of ultrafiltrate by-passes backwash manifold 42 and may either exit the system via valve 32*g*, or be divided and directed to one or more of exit valve 32*g*, nanofiltration unit 50, reverse osmosis membrane unit 60, or a combination of two or more of the foregoing system components. Thus during forward operation, the subsurface water treatment system may produce only ultrafiltrate 16, only nanofiltrate 56, only reverse osmosis membrane permeate 66, or a combination of two or more of the foregoing product streams. The system may produce as by-product streams; a retentate 58 stream rejected by the nanofiltration unit 50 and a retentate stream 68 rejected by reverse osmosis membrane unit 60. In one or more embodiments, valves 32*d*, 32*e*, 32*f* and 32*h* are closed during forward operation and at least one of valves 32*g*, 32*i* and 32*j* are open.

Still referring to FIG. 6, during a backwash cycle one or more of valves 32*a*, 32*b* and 32*c* (FIG. 4) are closed while keeping at least one of the aforementioned valves open. For purposes of illustration we will consider the case in which valve 32*c* has been closed and valves 32*a* and 32*b* remain open (FIG. 4). Under such circumstances, the bottommost ultrafiltration membrane unit is non-producing, whereas the topmost ultrafiltration membrane units continue to produce ultrafiltrate. With at least one of the ultrafiltration membrane units in a non-producing mode, the combined output of the forward operating ultrafiltration membrane units is moved from ultrafiltrate manifold 40 (FIG. 4) by pump 21*a*. By-passing backwash manifold 42, the ultrafiltrate may be directed through valve 32*h* to backwash manifold 42 and from there through valve 32*f* and backwash line 17*c* to the bottommost ultrafiltration membrane unit 12. Simultaneously, the system may deliver one or more useful product streams, the ongoing backwash cycle notwithstanding. Thus, during the backwash cycle the system may continue to produce a stream of ultrafiltrate 16 at valve 32*g*, a nanofiltrate stream 56, a reverse osmosis membrane permeate stream 66, or a combination of two or more of the foregoing streams.

In the embodiment shown, the electrochemical unit 18 is configured to receive a retentate stream 68 rejected by reverse osmosis membrane unit 60 and convert the same into antifoulant solution 19. Retentate stream 68 may be advantageously employed in the preparation of aqueous solution 19 comprising one or more hypohalous acid species since it will be rich in halide species (e.g. NaCl, NaBr) necessary for the production of hypohalous acid species, relative to seawater 14, ultrafiltrate 16, and nanofiltrate 56. In one embodiment, nanofiltrate 56 is used as the source fluid fed to reverse osmosis membrane unit 60. Nanofiltrate 56 is relatively free from divalent ions such as $Ca^{++}$ and $Mg^{++}$, species known to foul electrochemical cells. As a result, retentate 68 will be relatively free of $Ca^{++}$ and $Mg^{++}$ while being rich in useful halide salts such as sodium chloride. In an alternate embodiment, ultrafiltrate 16 may be employed as the source fluid for reverse osmosis membrane unit 60.

During a backwash cycle antifoulant solution 19 enters backwash manifold 42 where it mixes with ultrafiltrate 16 entering the manifold via open valve 32*h*. A mixture of antifoulant solution 19 and ultrafiltrate 16 (designated 19/16 in FIG. 6) is driven through open valve 32*f* and backwash line 17*c* to non-producing bottommost ultrafiltration membrane unit 12 through which it flows in a direction indicated by the dashed arrow labeled 25 (FIG. 4). As noted, 25 represents a discharge stream rich in particulates dislodged from membrane surfaces within the ultrafiltration membrane unit by the reverse flow of backwash fluid.

The system configuration illustrated by FIG. 6 may be especially useful in applications requiring water having low concentration of divalent species such as calcium ions, magnesium ions, sulfate ions and moderate salinity, for example certain enhanced oil recovery techniques involving water flooding or water/gas flooding of a subsurface hydrocarbon deposit. Under such circumstances, it may be advantageous to simultaneously produce a nanofiltrate stream 56 and a reverse osmosis membrane permeate stream 66 and subsequently mix the two streams at one or more stages of the flooding process.

Figure 7:
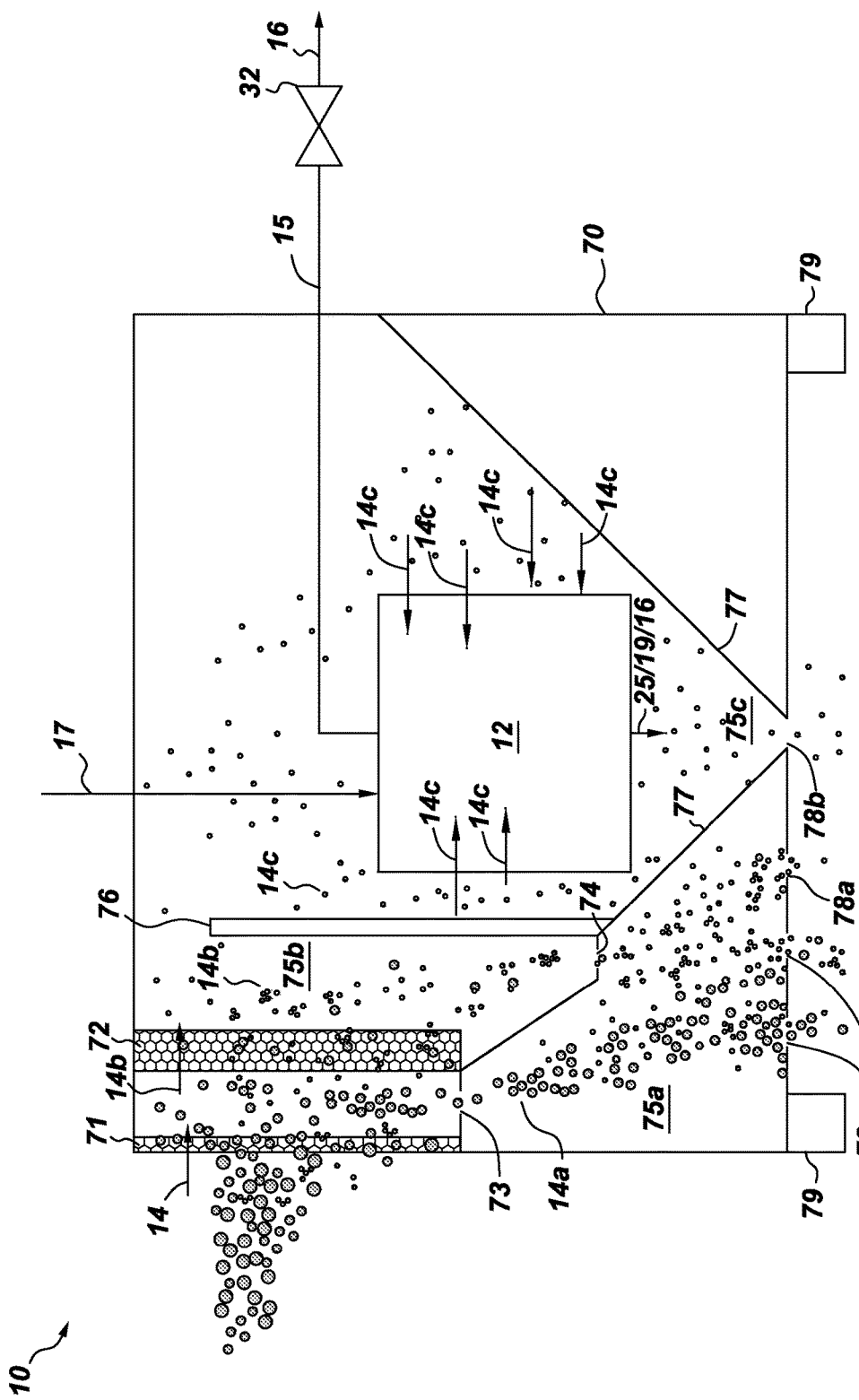
FIG. 7 illustrates a component of subsurface water treatment system provided by the present invention.

Referring to FIG. 7, the figure represents a portion of a subsurface water treatment system 10 provided by the present invention. In the embodiment shown, an ultrafiltration membrane unit 12 is disposed within housing 70 the interior of which is in fluid communication the subsurface environment through coarse and fine screen filters 71 and 72 respectively, and optionally via housing discharge outlets 78*a* and 78*b*, shown here as closed. In the embodiment shown, the housing is supported by support structures 79 which in turn may rest on the floor of the subsurface environment. In various embodiments of the present invention, housing 70 may enclose the entire subsurface water treatment system and include, in addition to those components illustrated in FIG. 7; valves, flow lines, pumps, manifolds, nanofiltration units, reverse osmosis membrane units, electrochemical units, sensors, controllers, storage vessels, spray jets, and other system components. During forward operation, ambient subsurface water 14 enters housing 70 via filters 71 and 72. Particulates entrained by the subsurface water may settle at various points within the housing which is equipped with one or more coarse particulate outlets 73 and fine particulate outlets 74 which act to remove particulates not excluded by screen filters 71 and 72 and susceptible to sedimentation. As the ambient subsurface water 14 enters the housing and progresses toward ultrafiltration membrane unit 12, the ambient water 14 is transformed first into source fluid 14*a* from which larger particulates have been removed by coarse filter 71 and source fluid 14*b* from which additional particulates have been removed by fine filter 72. Finally a weir structure 76, may act to further segregate particulates from source fluid 14*b* and provide source fluid 14*c*. Interior compartments 75*a*, 75*b* and 75*c* may act as sedimentation chambers. Sloped interior surfaces 77 and particulate outlets 73 and 74 may aid in the removal of particulates susceptible to sedimentation during forward operation. Not all particulates, however, will settle at useful rates, and as a result the differences in particulate content of source fluids 14b and 14c may be minimal Particulate outlets 73 and 74 are shown as open and particulate outlets 78a and 78b are shown as closed in FIG. 7, but may be independently opened and closed as dictated by one or more system sensors and controllers. During forward operation, source fluid 14c is drawn into and through ultrafiltration membrane unit 12, is transformed into ultrafiltrate 16 and delivered to other system components via ultrafiltrate production line 15.

Still referring to FIG. 7, during a backwash cycle, backwash fluid (e.g. 19/16) is introduced via backwash line 17 and forced to flow through the ultrafiltration membrane unit in a direction opposite flow during forward operation. As detailed herein, this reverse flow of backwash fluid dislodges particulates adhering to membrane surfaces of the ultrafiltration membrane unit 12 and produces a particulate laden discharge stream 25 which may exit the housing via one or more of particulate outlets 78a and 78b. A backwash cycle may include a filter backwash protocol as well. For example, following a backwash cycle step in which the interior of the housing has been purged by backwash fluid with particulate outlets 78a and 78b open, these same may be closed and the entire flow of backwash fluid directed back through filters 72 and 71 thereby dislodging particulates accumulated on filter surfaces.

Figure 8:
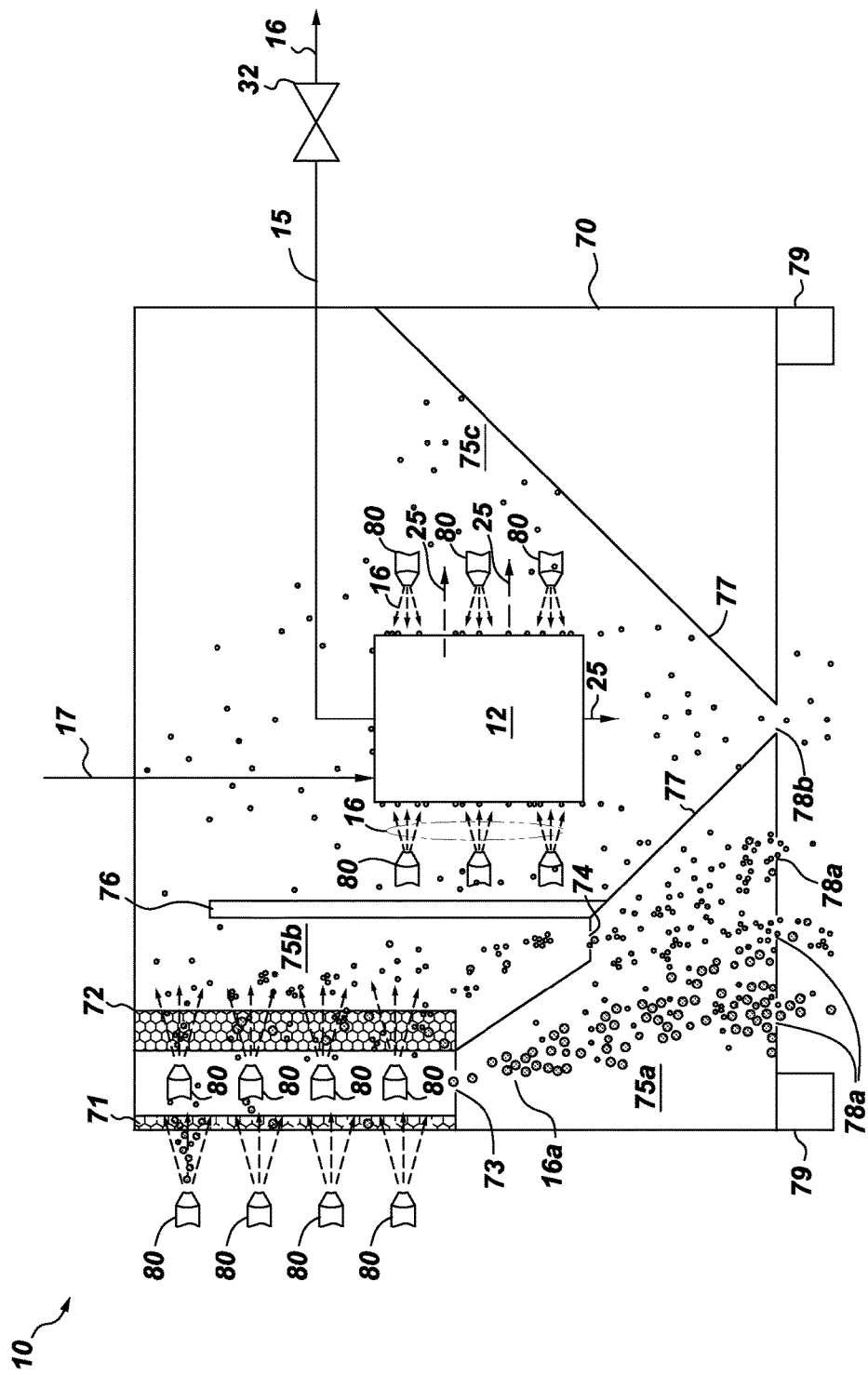
FIG. 8 illustrates a component of a subsurface water treatment system provided by the present invention.

Referring to FIG. 8, the figure represents a portion of a subsurface water treatment system 10 provided by the present invention comprising one or more turbulence generating devices configured to scour one or more surfaces of the system on which particulates accumulate. In the embodiment shown, spray jets 80 may be located in proximity to system surfaces on which particulates accumulate, the system surfaces including surfaces of coarse screen filter 71, fine screen filter 72 and the outer membrane surfaces of ultrafiltration membrane unit 12. In the embodiment shown system surfaces are being scoured with ultrafiltrate 16 during a backwash cycle in which discharge stream 25 and particles dislodged by the scouring action of the spray jets exits the housing through one or more of housing particulate outlets 78a and 78b. Particulate laden stream exiting the housing via particulate outlets 78a is labeled 16a since in the embodiment shown in FIG. 8 uses ultrafiltrate 16 as the scouring fluid. As noted, other suitable fluids may be employed as the scouring fluid. For example, in one or more embodiments, filtered source water 14b (FIG. 7) may be used as the scouring fluid.

In one or more embodiments, the present invention provides a method for producing purified water from an ambient subsurface water source, at times herein referred to as an ambient subsurface source fluid. Further, in one or more embodiments, the present invention provides a method for producing a hydrocarbon employing purified water derived from an ambient subsurface source fluid.

FIGS. 1-8 and accompanying descriptions provide detailed guidance for using the subsurface water treatment system provided by the present invention to produce purified water from ambient subsurface water. As noted, a first method step comprises introducing ambient subsurface source water into and through one or more ultrafiltration membrane units and producing thereby an ultrafiltrate substantially free of solid particulates having a largest dimension greater than 0.1 microns. As detailed herein, ambient subsurface water may be introduced into and through a system ultrafiltration membrane unit by the action of a system pump. In a second method step an aqueous solution comprising one or more hypohalous acid species is prepared in a system electrochemical unit in fluid communication with at least one system ultrafiltration membrane unit. In a third method step an ultrafiltrate-rich backwash fluid and at least a portion of the aqueous solution comprising one or more hypohalous acid species is delivered to at least one non-producing ultrafiltration membrane unit during a backwash cycle. In one or more embodiments, the total flux of ambient subsurface water through individual ultrafiltration membrane units is less than thirty gallons per square foot per day. As noted, operating the system at relatively low flux tends to reduce the frequency of backwash cycles needed to maintain optimal system performance.

In one or more embodiments, the present invention provides a method of producing a hydrocarbon. In a first step, the method comprises injecting purified water derived from an ambient subsurface source fluid into a hydrocarbon reservoir to stimulate flow of a hydrocarbon fluid from the reservoir. In a second and third step the method comprises receiving the hydrocarbon fluid in a hydrocarbon production well, and transporting the hydrocarbon fluid from the production well to a storage facility. The purified water is prepared using ambient subsurface water as the source fluid for a subsurface water treatment system provided by the present invention.

Figure 9:
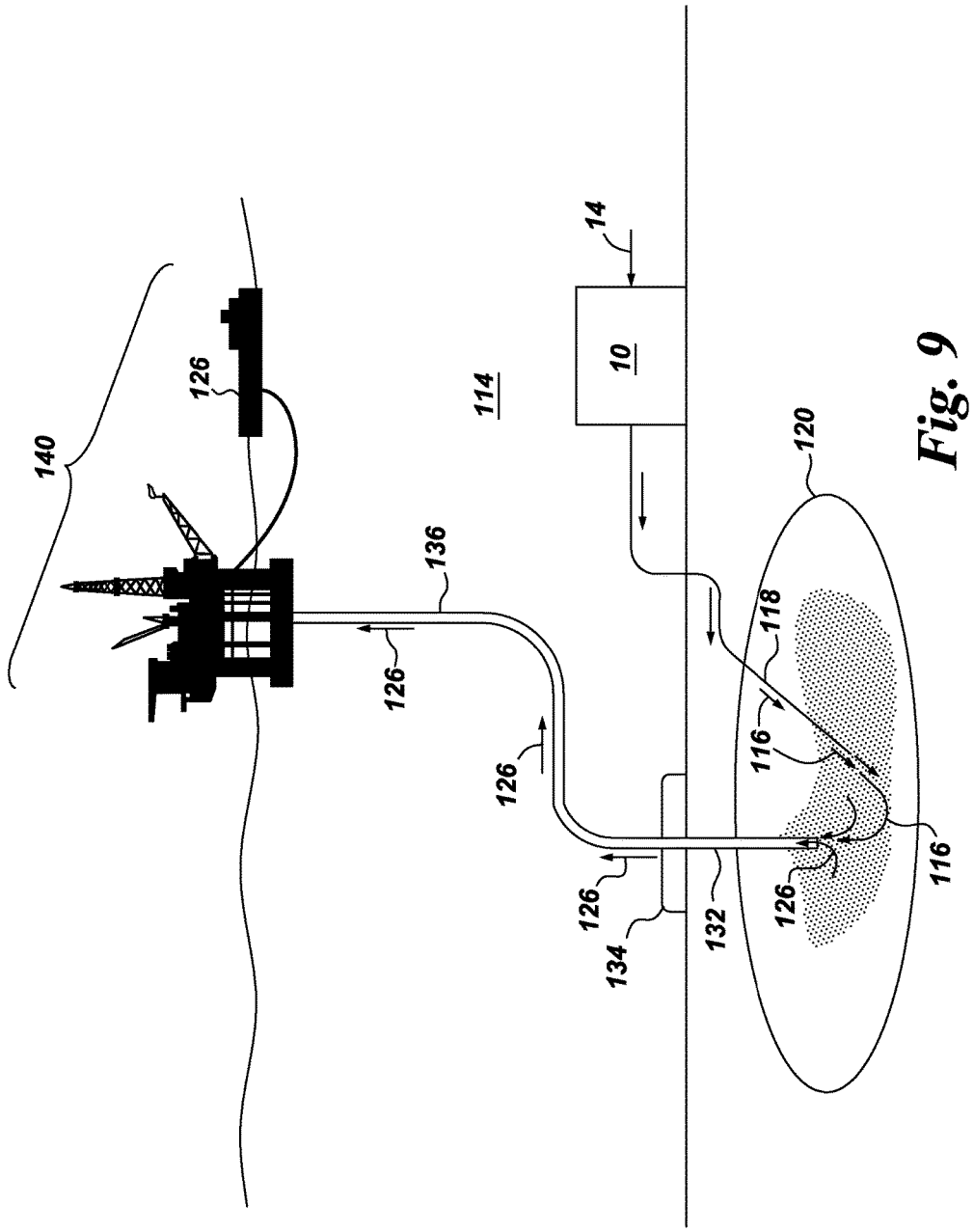
FIG. 9 illustrates an application of and method employing a subsurface water treatment system provided by the present invention.

Referring to FIG. 9, the figure illustrates a method of producing a hydrocarbon, the method representing one or more embodiments of the present invention. As illustrated in FIG. 9, ambient subsurface water 14 serves as a source fluid for a subsurface water treatment system 10 disposed within a subsurface environment 114. Subsurface water treatment system 10 produces at least one stream of purified water 116 which is pumped through injection well 118 and into hydrocarbon reservoir 120. The stream of purified water 116 may comprise one or more of the product streams produced by the subsurface water treatment system 10, including an ultrafiltrate stream 16, a nanofiltrate stream 56, or a reverse osmosis membrane permeate stream 66. In one or more embodiments, purified water stream 116 is a blend prepared from a nanofiltrate stream 56 and a reverse osmosis membrane permeate stream 66. In one or more embodiments, subsurface water treatment system 10 may be configured to add one or more agents designed to enhance recovery of hydrocarbon fluids from the reservoir, for example lignin sulfonates and hydrolyzed polyacrylamides. In one or more embodiments, purified water 116 may be alternately injected with carbon dioxide in a water-alternating-gas reservoir flooding protocol.

Purified water entering the reservoir via injection well 118 stimulates the flow of hydrocarbon fluids 126 toward and into production well 132. Hydrocarbon containing production fluids entering the well are transported via wellhead 134 and production riser 136 to storage facility 140. Production well 132 may be equipped with one or more electric submersible pumps which drive production fluids 126 toward the wellhead 134 and production riser 136. The wellhead installation may include equipment such as boosting pumps, production fluid separators, Christmas trees, and like equipment known to those of ordinary skill in the art to be necessary and useful in managing the output of a subsurface hydrocarbon production well.

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. A subsurface water purification method, comprising:
introducing ambient subsurface source water into and through a first ultrafiltration membrane unit and a second ultrafiltration membrane unit during a forward operating cycle using a system pump, thereby simultaneously producing an ultrafiltrate substantially free of solid particulates having a largest dimension greater than 0.1 microns;
preparing an aqueous solution comprising one or more hypohalous acid species in an electrochemical unit in fluid communication with the first ultrafiltration membrane unit; and
using the system pump to deliver at least a portion of the ultrafiltrate from one of the first and second ultrafiltration membrane units and at least a portion of the aqueous solution to the other one of the first and second ultrafiltration membrane units in an opposite direction of flow as the source water during a backwash cycle;
wherein a flux of the source water through each of the first and second ultrafiltration membrane units is less than thirty gallons per square foot per day.

2. The method according to claim 1, wherein the backwash cycle occurs at a frequency of less than five backwash cycles per day.

3. The method according to claim 2, wherein each backwash cycle is characterized by a duration of less than twenty minutes.

4. The method according to claim 1, wherein the backwash cycle is characterized by a duration of less than twenty minutes.

5. The method according to claim 1, further comprising subjecting the ultrafiltrate to a nanofiltration separation step in a nanofiltration unit, thereby producing a nanofiltrate and a retentate rejected by the nanofiltration unit.

6. The method according to claim 5, further comprising subjecting the ultrafiltrate to a reverse osmosis separation step in a reverse osmosis membrane unit, thereby producing a permeate and a retentate rejected by the reverse osmosis membrane unit.

7. The method according to claim 6, wherein a purified water stream comprises at least a portion of the nanofiltrate and at least a portion of the reverse osmosis membrane permeate.

8. The method according to claim 7, wherein the purified water stream contains less than two percent dissolved solids and less than one hundred parts per million sulfate species.

9. The method according to claim 7, wherein at least a portion of the retentate rejected by the reverse osmosis membrane unit is used as a source fluid for the aqueous solution comprising one or more hypohalous acid species.

10. The method according to claim 1, wherein the ambient subsurface source water is seawater.

11. A subsurface water purification method for producing purified water, comprising:
introducing ambient subsurface source water into and through a first ultrafiltration membrane unit and a second ultrafiltration membrane unit during a forward operating cycle of a subsurface water treatment system using a system pump, thereby producing an ultrafiltrate substantially free of solid particulates having a largest dimension greater than 0.1 microns;
preparing an aqueous solution comprising one or more hypohalous acid species in an electrochemical unit in fluid communication with the first ultrafiltration membrane unit;
performing one of:
(1) using the system pump to deliver at least a portion of the ultrafiltrate from one of the first and second ultrafiltration membrane units to the other one of the ultrafiltration membrane units in an opposite direction of flow as the source water during a backwash cycle; and
(2) using the system pump to deliver at least a portion of the ultrafiltrate from one of the first and second ultrafiltration units and at least a portion of the aqueous solution comprising one or more hypohalous acid species to the other one of the first and second ultrafiltration membrane units during a chemical backwash cycle of the subsurface water treatment system;
subjecting a first portion of the ultrafiltrate to a nanofiltration separation step in a nanofiltration unit of the subsurface water treatment system to produce a nanofiltrate and a retentate rejected by the nanofiltration unit; and
subjecting a second portion of the ultrafiltrate to a reverse osmosis separation step in a reverse osmosis membrane unit of the subsurface water treatment system to produce a permeate and a retentate rejected by the reverse osmosis membrane unit;
wherein a flux of the source water through each of the first and second ultrafiltration membrane units is less than thirty gallons per square foot per day.

12. The method according to claim 11, wherein a purified water stream comprises at least a portion of the nanofiltrate and at least a portion of the reverse osmosis membrane permeate.

13. The method according to claim 12, wherein the purified water stream contains less than two percent dissolved solids.

14. The method according to claim 12, wherein the purified water stream contains less than 100 parts per million sulfate species.

15. The method according to claim 11, wherein the ambient subsurface source water is seawater.

16. The method according to claim 11, wherein the electrochemical unit is configured to receive the reverse osmosis membrane unit retentate as a source fluid and to produce therefrom an aqueous solution comprising one or more hypohalous acid species.

17. The method according to claim 11, wherein the subsurface water treatment system is configured to produce at least one product stream not delivered to the the other one of the first and second ultrafiltration membrane units during the backwash cycle.

18. The method according to claim 11, wherein at least one of the first and second ultrafiltration membrane units comprises hollow fiber membrane structures.

19. A method of producing a hydrocarbon comprising:
injecting purified water derived from an ambient subsurface source fluid into a hydrocarbon reservoir to stimulate flow of a hydrocarbon fluid from the reservoir;
receiving the hydrocarbon fluid in a hydrocarbon production well; and
transporting the hydrocarbon fluid from the production well to a storage facility;
wherein the purified water is produced in a subsurface water treatment system comprising;
a first ultrafiltration membrane unit and a second ultrafiltration membrane unit configured to produce from the source fluid an ultrafiltrate substantially free of solid particulates having a largest dimension greater than 0.1 microns during a forward operating cycle using a system pump of the subsurface water treatment system;
a backwash unit comprising an electrochemical unit and the system pump, the electrochemical unit in fluid communication with at least one of the first and second ultrafiltration membrane units and capable of producing an aqueous solution comprising one or more hypohalous acid species, wherein the system pump is capable of delivering the ultrafiltrate from one of the first and second ultrafiltration membrane units to the other one of the ultrafiltration membrane units in an opposite direction of flow as the source fluid during a backwash cycle, and wherein the system pump is capable of delivering the ultrafiltrate from one of the first and second ultrafiltration membrane units and at least a portion of the aqueous solution from the electrochemical unit to the other one of the first and second ultrafiltration membrane units in an opposite direction of flow as the source fluid during a chemical backwash cycle;
a nanofiltration membrane unit configured to receive the ultrafiltrate and produce therefrom a nanofiltrate containing less than 100 parts per million sulfate species; and
a reverse osmosis membrane unit configured to receive the ultrafiltrate and produce therefrom a reverse osmosis membrane permeate and a reverse osmosis membrane retentate;
wherein a flux of the source fluid through each of the first and second ultrafiltration membrane units is less than 30 gallons per square foot per day, and wherein the reverse osmosis membrane retentate is used as a source fluid for the electrochemical unit.

20. The method according to claim 19, wherein the purified water comprises at least a portion of the nanofiltrate and at least a portion of the reverse osmosis membrane permeate.

* * * * *